(12) United States Patent
Fagrell et al.

(10) Patent No.: US 9,607,737 B2
(45) Date of Patent: *Mar. 28, 2017

(54) SEMICONDUCTIVE POLYOLEFIN COMPOSITION

(71) Applicant: Borealis Technology Oy, Porvoo (FI)

(72) Inventors: Ola Fagrell, Stenungsund (SE); Ann Watson, Arbroath (GB)

(73) Assignee: Borealis Technology Oy, Porvoo (FI)

( * ) Notice: Subject to any disclaimer, the term of this patent is extended or adjusted under 35 U.S.C. 154(b) by 45 days.

This patent is subject to a terminal disclaimer.

(21) Appl. No.: 14/656,072

(22) Filed: Mar. 12, 2015

(65) Prior Publication Data

US 2015/0187464 A1 Jul. 2, 2015

Related U.S. Application Data

(63) Continuation of application No. 12/447,038, filed as application No. PCT/EP2007/009329 on Oct. 26, 2007, now Pat. No. 9,006,575.

(30) Foreign Application Priority Data

Oct. 27, 2006 (EP) ..................................... 06022497

(51) Int. Cl.

| | | |
|---|---|---|
| *H01B 7/00* | (2006.01) | |
| *H01B 9/00* | (2006.01) | |
| *C08L 23/08* | (2006.01) | |
| *C09D 5/20* | (2006.01) | |
| *C09D 5/24* | (2006.01) | |
| *H01B 1/24* | (2006.01) | |
| *B29C 47/00* | (2006.01) | |
| *C08K 3/04* | (2006.01) | |
| *C08L 23/06* | (2006.01) | |
| *C08L 23/14* | (2006.01) | |

(52) U.S. Cl.
CPC ......... *H01B 9/006* (2013.01); *B29C 47/0004* (2013.01); *C08L 23/0892* (2013.01); *C09D 5/20* (2013.01); *C09D 5/24* (2013.01); *H01B 1/24* (2013.01); *C08K 3/04* (2013.01); *C08K 2201/001* (2013.01); *C08L 23/06* (2013.01); *C08L 23/142* (2013.01); *C08L 2203/202* (2013.01); *Y10T 428/2929* (2015.01)

(58) Field of Classification Search
CPC .................................. H01B 1/24; H01B 9/027
USPC ...................................... 174/102 SC, 120 SC
See application file for complete search history.

(56) References Cited

U.S. PATENT DOCUMENTS 9,006,575 B2 * 4/2015 Fagrell ................ C08L 23/0892
174/120 SC

* cited by examiner

*Primary Examiner* — Chau N Nguyen
(74) *Attorney, Agent, or Firm* — Milbank, Tweed, Hadley & McCloy LLP

(57) ABSTRACT

A semiconductive polyolefin composition comprising (i) up to 80 wt. % of a polyolefin (I), (ii) carbon black, and (iii) up to 60 wt. % of a polymer (II) having a melting point of not less than 100° C., wherein the polyolefin (I) comprises two different ethylene copolymers: a first ethylene copolymer and second ethylene copolymer; wherein the first ethylene copolymer comprises polar group containing co-monomers in the amount of 3.5 mol % or less; and wherein the second ethylene copolymer comprises silane group containing co-monomers in the amount of 0.7 mol % or less.

25 Claims, No Drawings

SEMICONDUCTIVE POLYOLEFIN COMPOSITION

This application a continuation of U.S. application Ser. No. 12/447,038, filed Apr. 24, 2009, which claims priority to International Application PCT/EP2007/009329, filed Oct. 26, 2007, which claims priority to European Patent Application No. 06022497.9, filed Oct. 27, 2006, the disclosures of which are incorporated by reference herein in their entireties.

The present invention relates to a semiconductive polyolefin composition providing superior mechanical and processing properties. The present invention further relates to a process for producing such a semiconductive polyolefin composition and its use in a semiconductive layer of a power cable.

Usually, medium and high voltage power cables comprise at least a first semiconductive layer, an insulating layer and a second semiconductive layer coated in that order on a conductor, e.g. made of aluminium or copper. The first and second semiconductive layers can be made of the same or different materials. Such semiconductive layers are normally crosslinkable so that they can be cross-linked or left non-cross-linked, as occasion demands.

Furthermore, the second semiconductive layer can be bonded to the insulation layer or can be strippable from that layer. Such a strippable layer can in principle be crosslinked or non-crosslinked.

The crosslinkable material in a semiconductive layer for a power cable has conventionally been a low density copolymer of ethylene (LDPE copolymer) produced in a high pressure polymerisation process. Conventionally, the crosslinking is effected after formation of the layered cable structure. The crosslinking is usually performed by the peroxide technology based on radical formation or by using crosslinkable vinyl co-monomers containing functional groups which are introduced by copolymerisation of ethylene with the co-monomer or by chemical grafting.

An example of crosslinking using functional groups is the so called silane technology, in which silane-group containing co-monomers contained in the ethylene polymer are exposed to moisture upon which silanol groups are formed. The silanol groups are then crosslinked by condensation in the presence of a silanol condensation catalyst.

If the peroxide technology is applied, care must be taken in the extrusion step of the polymer based layer materials because undesired crosslinking may occur during the extrusion step due to the elevated temperature used therein. On the other hand, the extrusion temperature of the layer material needs to be kept above the melting point of the polymer based layer materials and, usually, the difference between the melting point of the polymer and the extrusion temperature should be at least 20 to 25° C. in order to achieve desirable homogeneity.

For practical reasons, the production window of LDPE based polymers has been limited in prior art so that LDPE copolymers with a melting point of below 95° C. have typically been used. As conventional LDPE homopolymers typically have a melting point of at least 110° C., it has not been possible to use these homopolymers as such for semiconductive layer applications.

Furthermore, it is highly desirable to have certain mechanical properties, such as flexibility (elasticity), in the polymeric materials used for the production of the layers of a power cable. The cables should be flexible enough in order to withstand i.a. bending. Thus, crack and creep resistance of the layer materials are important features. The flexibility level of a cable is in practice defined by the insulation layer material which must, however, meet the demands of electrical insulating properties required for power cables. In simplified terms, the electrical insulating properties are prioritised over flexibility properties in insulation materials. Thus in practice, the semiconductive layer of a power cable should have a flexibility of at least the same level as that of the neighbouring insulating layer in order to provide a cable product being free of fractures along the thickness of the layers.

LDPE as such is flexible, but the semiconducting layers comprise normally carbon black (CB) to provide certain conductivity. However, carbon black further reduces the elastic properties of the polymer material. For that reason, co-monomers are usually incorporated in rather high amounts to increase the elasticity of LDPE based polymer materials for the semiconductive compositions.

By incorporation of such co-monomers increasing the elasticity, the crystallinity of the LDPE based polymer material is decreased. Therefore, according to conventional technologies, only LDPE based polymer materials having a crystallinity below 25% were used.

Moreover, the "low" melting point of the LDPE based polymer brings drawbacks also to the other processing steps in the preparation process of a semiconducting cable (especially medium voltage (MV) power cable applications), e.g. to the crosslinking step of the extruded cable structure. Namely, in the preparation process of power cables, the three layers are conventionally co-extruded on the conductor and then the cables are subjected to a crosslinking step in elevated temperature, typically to a steam or water treatment in elevated temperature (water is used particularly in case of silane-group containing crosslinkable material).

It is known that the crosslinking speed increases with the increase of the temperature. On the other hand, the melting point of the outer semiconductive layer material sets a limit to the usable temperature increase in the crosslinking step, since the layer softens and becomes sticky, when the temperature becomes close to the melting temperature. As a result, the wound cable in a cable drum (or reel) in the water bath adheres to neighbouring wound cable surfaces. Additionally, the deformation resistance of the cable is decreased. This is a problem especially for cables, such as for MV cables, having a semiconductive layer as the outer layer. Thus, the material of the outer semiconductive layer limits the usable crosslinking temperature resulting in longer curing times, and hence the maximum temperature used during the crosslinking step independent of the used crosslinking technology has conventionally been between 75 to 80° C.

A strippable semiconductive resin composition is known from U.S. Pat. No. 6,284,374 B1 which is suitable for an outer semiconductive layer of a crosslinked polyolefin-insulated wire and cable. Such a strippable semiconductive resin composition comprises a polymer component with a number average molecular weight of not less than $3 \times 10^4$ or a weight average molecular weight of not less than $3 \times 10^5$ and a melting point of 60 to 80° C., composed mainly of an ethylene-vinyl acetate copolymer, or a polymer component (b) composed mainly of 99 to 50 wt.-% of the ethylene-vinyl acetate copolymer and 1 to 50 wt.-% of a polyolefin having a melting point of 120° C. or above and conductive carbon black compounded with polymer component (a) or (b) to give a semiconductive layer having a volume resistivity of not more than 5000 Ω×cm at room temperature. However, as the ethylene copolymer according to this reference has an excessively low melting point and thus relatively high polar comonomer content, whereby the crosslinking step is carried out in the conventionally used temperature, see example 1, column 6, line 49.

On the other hand, U.S. Pat. No. 6,525,119 B2 discloses a composition useful for an internal semiconductive layer in a power cable having good adhesion qualities, low heat deformation and which can be extruded at comparatively high temperatures. Such a semiconductive polymer composition comprises one or more copolymers selected from the group consisting of (I), a copolymer of ethylene and vinyl acetate containing about 10 to about 50 wt.-% vinyl acetate; (II) a copolymer of ethylene and ethyl acrylate containing about 10 to about 50 wt.-% ethyl acrylate; (III) a copolymer of ethylene and butyl acrylate containing about 10 to 50 wt.-% butyl acrylate and based upon 100 parts of component (a), (b) about 55 to about 200 parts of a linear copolymer of ethylene and an alpha-olefin having 3 to 12 carbon atoms, (c) about 1 to about 50 parts of a specific organopolysiloxane, (d) about 10 to about 350 parts of carbon black and (e) optionally up to about 2 parts of an organic peroxide. Again in this embodiment, due to the excessively high content of the co-monomer in the ethylene copolymer, the melting point is excessively low so that the above-described drawbacks in the crosslinking step apply and the processing speed must be sacrificed.

A similar semiconductive resin composition for an insulation shield for a moisture-cured insulation layer comprising one or more copolymers selected from copolymers of ethylene and high amounts of a polar co-monomer are described in U.S. Pat. No. 6,706,791 B2 involving the same drawbacks as described above.

Therefore, it is an object of the present invention to provide a semiconductive polymer composition with improved mechanical properties, including a decreased stickiness, and improved processing properties including expanded processing temperatures.

Moreover, it is an object of the present invention to provide such a semiconductive polymer composition with improved processing properties such as homogeneity, crosslinkability and/or flexibility and elasticity of a final cable structure.

Unexpectedly and against the prior art teachings it has been found that these objects are achieved by providing a semiconductive polyolefin composition which contains a polyolefin with a rather low amount of co-monomer and thus with a rather high melting temperature.

The present invention therefore provides a semiconductive polyolefin composition comprising:
  (i) up to 80 wt. % of a polyolefin (I),
  (ii) carbon black, and
  (iii) optionally up to 60 wt. % of a polymer (II) having a melting point of not less than 100° C.,
wherein the polyolefin (I) has a co-monomer content of equal to or less than 4.3 mol %.

The "comonomer content" of polyolefin (I) means herein the total content of comonomer(s) present in polyolefin (I) component.

The comonomer content of polyolefin (I) in mol % is based on the total molar amount of monomers in polyolefin (I).

Polymer (II) may also be a blend of different polymers, wherein the properties defined herein for polymer (II) apply for the entire blend when applicable.

The inventive polymer composition ensures high elasticity and flexibility of a semiconductive cable layer comprising the composition with absence of crack and creep if wound on a cable drum.

According to the prior art, it was expected that such high melting polymers having low amounts of co-monomers as described above, would in turn sacrifice the processing properties, homogeneity and/or flexibility of the prepared cable structure. Unexpectedly and surprisingly, the present invention provides a very good balance between mechanical and processing properties. Thus, the inventive semiconductive polyolefin composition can be produced by a more simple production process and semiconductive layer compositions may be provided, which show improved resistance to heat deformation and decreased stickiness when wound on a cable drum.

Furthermore, the material for such a semiconductive layer having the inventive semiconductive polymer composition expands the processing window for producing the semiconductive layer enabling higher crosslinking temperatures resulting in shorter curing times and higher processing speed.

According to the present invention it is preferred that the polyolefin (I) has a degree of crystallinity of not less than 27%, more preferably not less than 29%, measured according to the methods as described below.

The upper limit of the crystallinity of polyolefin (I) is not critical and, as evident for the skilled person, depends on the used material.

Preferably, the polyolefin (I) is contained in the inventive polymer composition in the range of from 40 to 80 wt.-%, more preferably from 40 to 60 wt. %, still more preferably from 45 to 60 wt. %, and most preferably from 55 to 60 wt.-%, based on the total weight of the semiconductive polyolefin composition.

Preferably, polymer (II) is present in the composition, preferably in an amount of up to 60 wt.-%, more preferably in an amount of from 5 to 40 wt.-%, still more preferably of from 10 to 35 wt.-%, even more preferably of from 10 to 30 wt.-% based on the weight of the total amount of polyolefin (I) and polymer (II), more preferably based on the total weight of the semiconductive polyolefin composition.

Furthermore, preferably, the weight ratio polyolefin (I): polymer (II) is from 5:1 to 1:1, more preferably from 4:1 to 1.5:1.

In a preferred embodiment of the present invention, in the composition apart from polyolefin (I) and polymer (II) no further polymeric components are present, i.e. the entirety of the polymeric components of the composition, which preferably makes up at least 90 wt. % of the total composition, consists of polyolefin (I) and polymer (II). Preferably, the polymer (II) has a melting point of up to 170° C., more preferably has a melting point in the range of from 100 to 170° C., and still more preferably from 110 to 135° C., measured according to ISO 3146.

It is further preferred that the polyolefin (I) is an ethylene homo- or copolymer, more preferably is a high pressure ethylene copolymer (LDPE copolymer) comprising one or more comonomers. The high pressure LDPE copolymer (I) is produced by high pressure radical polymerisation. High pressure polymerisation is a well known technology in the polymer field and can be effected in a tubular reactor or an autoclave reactor. Preferably, it is a tubular reactor. Further details about high pressure radical polymerisation are given in WO 93/08222.

In a high pressure process, the polymerisation is generally performed at pressures in the range of 1200 to 3500 bar and at temperatures in the range of 150 to 350° C.

The high-pressure polyethylene of component (I) preferably has a melting point of not less than 95° C., more preferably not less than 97° C., measured according to ASTM D3418. In one preferred embodiment, the melting point of the polyolefin (I) is as high as 98° C. or more, even 100° C. or more, may be desired. The upper limit is not particularly limited, and can be e.g. less than 115° C.

Preferably, the polyolefin (I) is a copolymer of ethylene with at least a polar group containing comonomer which is not a silane group containing polar comonomer.

The semiconductive polyolefin composition can be non-crosslinkable or crosslinkable. Preferably said semiconductive polyolefin composition is crosslinkable for producing a cable comprising crosslinked semiconductive layer(s).

In one embodiment the polyolefin (I) contains polar group containing comonomer(s) as the comonomer only, whereby the polar comonomer content is preferably 4.3 mol % or less, preferably 4.0 mol % or less, more preferably 3.5 mol % or less and in some embodiments 2.5 mol % or less or even 2.0 mol % or less may be desired.

In this embodiment, the $MFR_2$ (ISO 1133, 190° C., 2.16 kg) of polyolefin (I) is preferably 1 g/10 min or more, and is typically less than 50 g/10 min. More preferably, the $MFR_2$ is between 10 and 30 g/10 min.

In case of crosslinkable semiconductive polyolefin composition the polyolefin (I) is preferably a terpolymer of ethylene with a polar group containing co-monomer and a silane group containing co-monomer. Thus, in another embodiment the polyolefin (I) is a terpolymer which may contain 4.3 mol % or less, preferably 4.0 mol % or less, more preferably 3.5 mol % or less, and in some embodiments even 2.5 mol % or less or 2.0 mol % or less of a polar group containing comonomer; and up to 1.0 mol %, preferably 0.5 mol % or less and in some embodiments even 0.4 or less mol % of a silane group containing comonomer. The total comonomer content of the polyolefin (I), i.e. terpolymer, is 4.3 mol % or less, preferably 3.5 mol % or less, more preferably 2.5 mol % or less. In some embodiments even 2.3 mol % or less may be desired. In case the polyolefin (I) is a terpolymer as defined above or below, the $MFR_2$ (ISO 1133, 190° C., 2.16 kg) of polyolefin (I) is preferably more than 0.01 g/10 min, preferably is 0.1 to 15 g/10 min, and most preferably is 0.3 to 10 g/10 min.

Polyolefin (I) may comprise one or more copolymers of olefins, preferably ethylene, with one or more comonomers, e.g. two different copolymers, such as two terpolymers. Then, the comonomer content of polyolefin (I) is the sum of comonomers present in each copolymer of polyolefin (I) and is less than 4.3% by mole (mol %), preferably equal to or less than 4.0 mol %, more preferably equal to or less than 3.5 mol %. In some embodiments equal to or less than 2.5 mol % may even be desired. Preferably the polyolefin (I) consists of only one copolymer of ethylene with one or more comonomers as defined above.

In a further preferred embodiment, polyolefin (I) consists of a terpolymer which has a content of polar group containing comonomer of 4.3 mol % or less, preferably 4.0 mol % or less, more preferably 3.5 mol % or less, most preferably 2.5 mol % or less and in some embodiments even 2.0 mol % or less may be desired, and a content of silane group containing comonomer of 0.7 mol % or less, preferably 0.5 mol % or less, more preferably 0.4 mol % or less, and in some embodiments even 0.38 mol % or less may be desired; provided that the total comonomer content of polyolefin (I) is 4.3 mol % or less, preferably 3.5 mol % or less, more preferably 2.5 mol % or less. In some embodiments even 2.3 mol % or less may be desired.

In all embodiments of polyolefin (I), the comonomer content is usually 0.5 mol % or higher, preferably is 1.0 mol % or higher and most preferably is 1.5 mol % or higher.

The density of polyolefin (I) in all embodiments is typically more than 900 kg/m$^3$, preferably 910 to 930 kg/m$^3$, and most preferably 910 to 925 kg/m$^3$.

In the embodiments when silane group containing comonomers are present in polyolefin (I) which may either be introduced by copolymerisation or grafting, the amount of those is usually 0.1 mol % or higher, preferably 0.2 mol % or higher.

The expression "polar group containing co-monomer" is intended to cover both the cases where only one type of polar groups is present and the case where two or more different types of polar groups are present. Similarly, the expression "silane group containing co-monomer" is intended to cover both the cases where only one type of silane group is present and the case where two or more different types of silane groups are present.

Preferably, polar groups are selected from siloxane, amide, anhydride, carboxylic, carbonyl, hydroxyl, ester and epoxy groups.

The polar groups may be introduced into the polyolefin (I) by copolymerisation of olefinic, including ethylene, monomers with co-monomers bearing polar groups.

Alternatively, the polar groups may also be introduced into the polymer by grafting of an ethylene polymer with a polar group containing compound, i.e. by chemical modification of the polyolefin, by addition of a polar group containing compound mostly in a radical reaction. Grafting is e.g. described in U.S. Pat. No. 3,646,155 and U.S. Pat. No. 4,117,195.

Preferred means for introducing the polar group is the copolymerisation with polar comonomers.

As examples of comonomers having polar groups may be mentioned the following: (a) vinyl carboxylate esters, such as vinyl acetate and vinyl pivalate, (b) (meth)acrylates, such as methyl(meth)acrylate, ethyl(meth)acrylate, butyl(meth)acrylate and hydroxyethyl(meth)acrylate, (c) olefinically unsaturated carboxylic acids, such as (meth)acrylic acid, maleic acid and fumaric acid, (d) (meth)acrylic acid derivatives, such as (meth)acrylonitrile and (meth)acrylic amide, and (e) vinyl ethers, such as vinyl methyl ether and vinyl phenyl ether.

Amongst these comonomers, vinyl esters of monocarboxylic acids having 1 to 4 carbon atoms, such as vinyl acetate, and (meth)acrylates of alcohols having 1 to 4 carbon atoms, such as methyl(meth)acrylate, are preferred.

Especially preferred comonomers are butyl acrylate, ethyl acrylate and methyl acrylate. Two or more such olefinically unsaturated compounds may be used in combination. The term "(meth)acrylic acid" is intended to embrace both acrylic acid and methacrylic acid.

Preferably, the polar group containing comonomer units are selected from the group of acrylates.

As mentioned the semiconductive polyolefin composition is preferably crosslinkable, whereby the polyolefin (I) preferably comprises silane-group containing monomer units. The silane groups may preferably be introduced into a polyolefin (I) via copolymerisation of silane groups containing comonomers with ethylene and optionally with other comonomers, preferably with polar group containing comonomer(s), to form a terpolymer (I) as defined above.

Alternatively, the silane groups may also be incorporated to a polyolefin (I) via grafting, as e.g. described in U.S. Pat. No. 3,646,155 and U.S. Pat. No. 4,117,195. For grafting, the same silane group-containing compounds may be used as are used as comonomers in the case of copolymerisation.

In an especially preferred embodiment polyolefin (I) is an ethylene copolymer which contains only polar comonomer units and silane group-containing comonomer units, which may have been introduced into the polyethylene either by copolymerisation or by grafting.

If copolymerisation is used for introducing silane-group containing comonomers into polyolefin (I), preferably the copolymerisation is carried out with an unsaturated silane compound represented by the formula $$R^1SiR^2_qY_{3-q} \quad (I)$$

wherein $R^1$ is an ethylenically unsaturated hydrocarbyl, hydrocarbyloxy or (meth)acryloxy hydrocarbyl group, $R^2$ is an aliphatic saturated hydrocarbyl group, Y which may be the same or different, is a hydrolysable organic group and q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is alkoxy, such as methoxy or ethoxy, alkylcarbonyloxy, such as formyloxy, acetoxy or propionyloxy, or an alkyl- or arylamino group; and $R^2$, if present, is a methyl, ethyl, propyl, decyl or phenyl group.

A preferred unsaturated silane compound is represented by the formula $$CH_2=CHSi(OA)_3 \quad (II)$$

wherein A is a hydrocarbyl group having 1-8 carbon atoms, preferably 1-4 carbon atoms.

Preferably, the silane group containing monomer units are selected from the group of vinyl tri-alkoxy silanes.

The most preferred compounds are vinyl trimethoxysilane, vinyl bismethoxyethoxysilane, vinyl triethoxysilane, gamma-(meth)acryl-oxypropyltrimethoxysilane, gamma (meth)acryloxypropyltriethoxysilane, and vinyl triacetoxysilane.

The copolymerisation of the ethylene with polar group containing comonomer and optionally with the unsaturated silane group containing comonomer may be carried out under any suitable conditions resulting in the copolymerisation of the monomers.

The optional polymer (II) may be any type of polymer suitably selected for the purposes of the present invention, as long as it possesses a melting point of not less than 100° C., preferably 100 to 170° C., more preferably up to 165° C., such as 100 to 150° C. The polymer (II) may be selected from the group consisting of $C_2$ to $C_4$ polyolefins, polystyrene, and any blend thereof. It may especially comprise polyethylene, such as LDPE homo- or copolymer produced by high pressure polymerisation, a well known polyethylene produced by low pressure polymerisation, such as linear low density polyethylene (LLDPE), medium density polyethylene (MDPE) or high density polyethylene (HDPE), polypropylene or polybutylene. If the polymer (II) comprises or consists of polyethylene, this is preferably LDPE homopolymer.

When the polymer (II) is LLDPE or LDPE, preferably LDPE, the $MFR_2$ (ISO 1133, 190° C., 2.16 kg) is preferably 1 g/10 min or more, and is typically less than 50 g/10 min. More preferably, the $MFR_2$ is between 10 and 30 g/10 min. The density of polymer (II) in this embodiment is typically more than 900 kg/m$^3$, preferably 910 to 930 kg/m$^3$, and most preferably 910 to 925 kg/m$^3$.

It is particularly preferred that the polymer (II) comprises or consists of homopolymers of propylene, random copolymers of propylene or heterophasic copolymers of propylene.

In this embodiment, the $MFR_2$ (ISO 1133, 230° C., 2.16 kg) of polymer (II) preferably is more than 0.5 g/10 min and typically up to 100 g/10 min, more preferably is between 1 and 30 g/10 min.

Suitable homo, random and heterophasic polypropylenes (PP) as component (II) may be any known PP polymer, e.g. any commercially available PP polymer, or such PP polymer may be produced using common polymerisation processes known in the art. The polypropylene polymer may be produced in a single- or multistage process of propylene or propylene and one or more comonomers, such as ethylene or higher alpha olefin. The polymerisation can be effected as bulk polymerisation, gas phase polymerisation, slurry polymerisation, solution polymerisation or combinations thereof using conventional catalysts including Ziegler-Natta and metallocene catalysts. E.g. homopolymer or random copolymer of polypropylene can be made either in one or two or more loop reactors or gas phase reactors or in a combination of a loop and at least one gas phase reactor. In case of heterophasic copolymer of polypropylene the matrix of homo or random copolymer can be produced e.g. in a single stage or as a multistage process described above and the elastomeric (rubber) part of the propylene copolymer can be produced as a in-situ polymerisation e.g. in a separate reactor, e.g. gas phase reactor in the presence of the matrix polymer produced in the previous stage. Alternatively the elastomeric copolymer of propylene part can be compounded to the matrix phase material. The heterophasic copolymer of polypropylene thus is comprised of a matrix phase of homo- or copolymer of polypropylene and an elastomeric propylene copolymer dispersed in the matrix. Such heterophasic compounds e.g. are described in EP 1 244 717. The above processes are well known in the field.

Preferably, said polypropylene (II) has a melting point of up to 165° C., such as 100 to 150° C., preferably 100 to 135° C.

Generally, suitable polymers as polyolefin components (I) and (II) may be any known polymers, e.g. commercially available polymers, or they can prepared according to or analogously to polymerisation methods described in the literature of polymer field.

In a preferred embodiment of the polyolefin composition of the present invention comprises polyolefin (I), polymer (II) and carbon black.

Furthermore, the composition preferably consists of polyolefin (I), polymer (II) and carbon black and usual additives in an amount of 5 wt. % or less, more preferably of 2 wt. % or less.

The amount of carbon black is selected so as to make the layer(s) of the invention semiconducting.

As the carbon black component, any carbon black suitable for semiconductive layer can be chosen depending on the desired use and conductivity of the composition. The amount of carbon black can vary. Especially the amount of carbon black depend on the amounts of components (I) and (II) in the polyolefin composition.

Preferably, the crosslinking polymer composition comprises 15 to 50 wt % of carbon black, based on the weight of the semiconductive polyolefin composition. In other preferred embodiments, the amount of carbon black may be 10 to 45 wt.-%, 20 to 45 wt %, 30 to 45 wt %, 35 to 45 wt % or 36 to 41 wt %, based on the weight of the semiconductive polyolefin composition.

As already mentioned carbon black can be used which is electrically conductive, e.g. carbon blacks grades described with ASTM Nxxx codes, acetylene black, furnace black and Kjeten black. Examples of suitable carbon blacks are disclosed e.g. in WO 98/014516.

Preferably, carbon black may be contained in an amount of up to 45 wt.-%, based on the total weight of the composition. In this manner, the volume resistivity of the inventive polyolefin composition can advantageously be adjusted to 100000 Ω-cm or below, more preferably to 1000 Ω-cm or below, or in some applications even to 100 Ω-cm or below, as determined according to ASTM D 991 and/or ISO 3915.

Volume resistivity is in a reciprocal relationship to electrical conductivity, i.e. the lower resistivity, the higher is conductivity.

The semiconductive polyolefin composition for one or more semiconductive layers of a power cable of the present invention may or may not be crosslinkable, depending on the desired end use, as well known in the field. In case of crosslinkable semiconductive polyolefin composition the crosslinking is effected after the formation (extrusion) of the layered cable structure.

Crosslinking might be, achieved by all processes known in the art, in particular by incorporating a radical initiator into the polymer composition which after extrusion is decomposed by heating, thus effecting crosslinking. Or, e.g. in case the semiconductive polyolefin composition comprises a polyolefin (I) which contains silanol groups, preferably originating from the silanol containing comonomer, by incorporating a silanol condensation catalyst, which after production of the cable upon intrusion of moisture into the cable links together the hydrolysed silane groups, as well known in the field.

Examples for acidic silanol condensation catalysts comprise Lewis acids, inorganic acids such as sulphuric acid and hydrochloric acid, and organic acids such as citric acid, stearic acid, acetric acid, sulphonic acid and alkanoic acids as dodecanoic acid.

Preferred examples for a silanol condensation catalyst are sulphonic acid and tin organic compounds.

Preferably, a Brönsted acid, i.e. a substance which acts as a proton donor, or a precursor thereof, is used as a silanol condensation catalyst.

Such Brönsted acids may comprise inorganic acids such as sulphuric acid and hydrochloric acid, and organic acids such as citric acid, stearic acid, acetic acid, sulphonic acid and alkanoic acids as dodecanoic acid, or a precursor of any of the compounds mentioned.

Preferably, the Brönsted acid is a sulphonic acid, more preferably an organic sulphonic acid.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

$$Ar(SO_3H)_x \qquad (III)$$

with Ar being an aryl group which may be substituted or non-substituted, and x being at least 1, preferably being 1 to 4.

The organic aromatic sulphonic acid silanol condensation catalyst may comprise the structural unit according to formula (III) one or several times, e.g. two or three times. For example, two structural units according to formula (III) may be linked to each other via a bridging group such as an alkylene group.

The currently most preferred compounds are dodecyl benzene sulphonic acid and tetrapropyl benzene sulphonic acid.

The silanol condensation catalyst may also be precursor of the sulphonic acid compound, for example the acid anhydride of a sulphonic acid compound, or a sulphonic acid that has been provided with a hydrolysable protective group, as e.g. an acetyl group, which can be removed by hydrolysis.

Furthermore, preferred sulphonic acid catalysts are those as described in EP 1 309 631 and EP 1 309 632, namely
a) a compound selected from the group of
(i) an alkylated naphthalene monosulfonic acid substituted with 1 to 4 alkyl groups wherein each alkyl group is a linear or branched alkyl with 5 to 20 carbons with each alkyl group being the same or different and wherein the total number of carbons in the alkyl groups is in the range of 20 to 80 carbons;
(ii) an arylalkyl sulfonic acid wherein the aryl is phenyl or naphthyl and is substituted with 1 to 4 alkyl groups wherein each alkyl group is a linear or branched alkyl with 5 to 20 carbons with each alkyl group being the same or different and wherein the total number of carbons in the alkyl groups is in the range of 12 to 80;
(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and
b) a compound selected from the group of
(i) an alkylated aryl disulfonic acid selected from the group consisting of the structure:

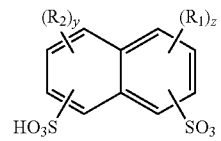

and the structure:

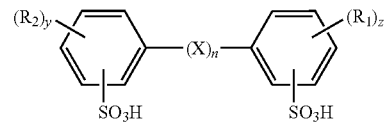

wherein each of $R^1$ and $R^2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbons and n is 1; —C(=O)—, wherein n is 1; —S—, wherein n is 1 to 3 and —S(O)$_2$—, wherein n is 1; and
(ii) a derivative of (i) selected from the group consisting of the anhydrides, esters, epoxy blocked sulfonic acid esters, acetylates, and amine salts thereof which is a hydrolysable to the alkylated aryl disulfonic acid, together with all preferred embodiments of those sulphonic acids as described in the above-mentioned European patents.

Accordingly, crosslinking may be achieved by incorporating the crosslinking agent, which may be a radical initiator such as azo component or preferably a peroxide, or the above described silanol condensation catalyst into the polymer composition used for the production of one or more of the cable layers in amounts and manner conventionally known in the field. Preferably, e.g. the silanol condensation catalyst is incorporated to one or more of the layer compositions in an amount of 0.0001 to 6 wt.-%, more preferably of 0.001 to 2 wt.-% and most preferably of 0.05 to 1 wt.-%.

The present invention further provides a power cable comprising at least one semiconductive layer comprising the polyolefin composition of the present invention.

Preferably, the power cable may comprise a conductor, a first semiconductive layer (a), an insulation layer (b) and a second semiconductive layer (c), each coated on the conductor in this order, wherein at least one of the first and second semiconductive layer(s) (a; c) comprises a semiconductive polyolefin composition according to the present invention as described above.

In a further preferred embodiment of the inventive power cable both the first (a) and second (c) semiconductive layers, comprise, more preferably consist of, the semiconductive polyolefin composition according to the present invention.

In a further preferable embodiment, at least one of the first and second semiconductive layers (a; c) is crosslinkable, preferably both first (a) and second (c) semiconductive layers are crosslinkable.

According to another embodiment of the inventive power cable the second semiconductive layer (c) may be strippable or non-strippable, preferably non-strippable. If strippable, then it may preferably be crosslinkable.

The insulation layer (b) is well known in power cable field and can comprise any polymeric material suitable and/or conventionally used for such insulation layer. Also the insulation layer (b) is preferably crosslinkable.

Accordingly, the invention also provides a process for producing a power cable, wherein the process comprises providing the semiconductive polyolefin composition according to the present invention by blending polyolefin (I), carbon black, and optionally, polymer (II) together, optionally with additives, above melting point of the polymer components, extruding the melt at elevated temperature above the melting point of the polymer components on a conductor for forming at least one semiconductive polymer layer on a conductor for a power cable.

Preferably, the semiconductive polyolefin composition is co-extruded on the conductor together with one or more further cable layer(s) forming polymeric composition(s), thus providing a multilayered power cable, preferably a multilayered power cable defined above. After providing the layered power cable structure, preferably the multilayered power cable as defined above, the cable is collected, and preferably wound onto a cable drum.

The additives can be any conventional additive and in amounts used in the field of semiconductive layers, such as stabiliser, preferably a phenolic stabiliser. The blending of the polyolefin (I), carbon black and polymer (II) optionally with conventional additives is typically carried out in an extruder in a known manner, whereby such mixing step precedes the following co-extrusion step for forming the cable layers.

Preferably, the obtained power cable is a crosslinkable power cable, comprising at least a first semiconductive layer which comprises, preferably consists of, a crosslinkable semiconductive polyolefin composition of the invention as defined above. More preferably, the obtained cable is a crosslinkable multilayered power cable as defined above, wherein at least one of the first semiconductive layer (a), the insulation layer (b) and a second semiconductive layer (c), preferably all of (a), (b) and (c), are crosslinkable.

In case of a crosslinkable power cable, after the formation of the layered cable structure, the power cable, preferably in cable drums is then subjected to a crosslinking step in a manner known in the cable field. The crosslinking is typically effected in a steam or water treatment at elevated temperature. It is preferred that the crosslinking temperature is in the range of from 80 to 100° C., more preferably 85 to 95° C.

The power cable of the present invention may be prepared according to conventional cable preparation methods which are per se known in the art.

Furthermore, the invention provides a non-crosslinked or, preferably, a crosslinked power cable. Further preferably, the cable is a multilayered cable as defined above, wherein at least one of the layers of the power cable as described above is crosslinked. In a further preferred embodiment of the inventive power cable both the first (a) and second (c) semiconductive layers, comprise the semiconductive polyolefin composition according to the present invention. Also preferably, the insulation layer (b) is crosslinked.

The power cables of the present invention are especially suited for medium voltage (MV) and high voltage (HV) power cable applications. Preferably, the power cable of the invention is a MV power cable rated between 3.3 to 36 kV.

The present invention is now described in more detail with reference to the following non-limiting examples which serve to illustrate the advantages and superiority of the present invention and shall not be interpreted to limit its scope.

METHODS AND EXAMPLES

1. Methods a) Melt Flow Rate

The melt flow rate is equivalent to the term "melt index" and is determined in accordance with ISO 1133 for polyethylenes at 190° C. and at loads 2.16 kg ($MFR_2$), at 5 kg ($MFR_5$) or at 21.6 kg ($MFR_{21}$). $MFR_2$ for polypropylenes is measured (ISO 1133) at 230° C. at 2.16 kg. Melt flow rate values are indicated in g/10 min.

b) Stickiness

Stickiness was measured according to the following method:
  1 mm plaques (10×10 cm) were made from pellets by pressing 10 min at 170° C.,
  two plaques of same material were put together in an oven, and on the top a 200 g weight was put,
  the samples were stored in oven at testing temperature for 16 h,
  the samples were taken out and conditioned at room temperature for minimum 1 h,
  it was tried by hand to separate the two plaques from each other.
The stickiness behaviour was evaluated according to the following scale:

1: Not possible to separate, 3: Acceptable, 5: No adhesion.

c) Density

The density of the used polymers was measured in accordance with ASTM D792.

d) Volume Resistivity

The volume resistivity of the semiconductive material is measured on crosslinked polyethylene cables according to ISO 3915 (1981).

Cable specimens having a length of 13.5 cm are conditioned at 1 atm and 60±2° C. for 5±0.5 hours before measurement. The resistance of the outer semiconductive layer is measured using a four-terminal system using metal wires pressed against the semiconductive layer. To measure the resistance of the inner semiconductive layer, it is necessary to cut the cable in two halves, removing the metallic conductor. The resistance between the conductive silver paste applied onto the specimen ends is then used to determine the volume resistivity of the inner semiconductive layer. The measurements were carried out at room temperature and 90° C.

The same procedure is used to determine the volume resistivity of compositions that have not yet been cross-linked.

e) Oil Adsorption Number

Oil adsorption numbers of the carbon black samples was measured in accordance with ASTMD2414.

f) Iodine Number

Iodine numbers of the carbon black samples was measured in accordance with ASTM D1510.

g) Melting Temperature, Crystallization Temperature (Tcr), and Degree of Crystallinity (ASTM D3418)

The melting temperature Tm of the used polymers was measured in accordance with ASTM D3418.

Tm and Tcr were measured with Mettler TA820 differential scanning calorimetry (DSC) on 3±0.5 mg samples. Both crystallization and melting curves were obtained during 10° C./min cooling and heating scans between −10 to 200° C. Melting and crystallization temperatures were taken as the peaks of endotherms and exotherms.

The degree of crystallinity was calculated by comparison with heat of fusion of a perfectly crystalline polyethylene, i.e. 290 J/g.

h) Comonomer Content

Comonomer content (wt %) was determined in a known manner based on Fourier transform infrared spectroscopy (FTIR) determination calibrated with $^{13}$C-NMR. All FTIR methods were run by FTIR a Perkin Elmer 2000, 1 scan, resolution 4 cm$^{-1}$. The peak for the comonomer was compared to the peak of polyethylene (e.g. the peak for butyl acrylate at 3450 cm$^{-1}$ was compared to the peak of polyethylene at 2020 cm$^{-1}$ and the peak for silane at 945 was compared to the peak of polyethylene at 2665 cm$^{-1}$. The calibration with $^{13}$C-NMR is effected in a conventional manner which is well documented in the literature. Such calibrations are evident for a skilled person. As a reference for calibration, reference is made to Haslam J, Willis H A, Squirrel D C., "Identification and analysis of plastics", 2$^{nd}$ Edition, London, Iliffe Books, 1972. The weight-% was converted to mol-% by calculation.

The polar comonomer content can also be analyzed by NMR, which gives corresponding results as Comonomer Content (NMR). The comonomer content was determined by using $^{13}$C-NMR. The $^{13}$C-NMR spectra were recorded on Bruker 400 MHz spectrometer at 130° C. from samples dissolved in 1,2,4-trichlorobenzene/benzene-d6 (90/10 w/w).

An alternative method to determine comonomer content (e.g. silane and polar comonomer) is to use NMR-method which would give equal results to the above X-ray and FTIR method, i.e. results would be comparable to the purposes of the invention.

2. Compositions Prepared

The following formulations for semiconductive polyolefin compositions were prepared separately and the components were mixed together in a 46 mm BUSS co-mixer at the melt temperature of 165 to 200° C. in manner well known for a skilled person. The ingredients and components are listed in Table 1 and the composition of the ingredients are listed in Table 2.

Preparation Examples

Polyolefin (I) of the Reference Semiconductive Composition Terpolymer 1 (Reference)

Terpolymer 1 was produced by high-pressure polymerisation with free radical initiation, wherein ethylene monomers were reacted with vinyl trimethoxysilane (VTMS) and butylacrylate (BA) co-monomers amounts so as to yield 1.8 wt % (0.36 mol %) silane content and 17 wt % (4.4 mol %) BA content in final terpolymer 1, under the action of a radical initiator in a reactor at a high pressure of about 120 to 350 MPa and an elevated temperature of between 150 to 350° C. When the reaction was completed, the temperature and the pressure were lowered, and the resulting unsaturated polymer recovered.

Polyolefin (I) of the Semiconductive Composition of the Invention: Terpolymer 2

Terpolymer 2 was produced as described for terpolymer 1, but adapting in the known manner the (co-)monomer feeds to obtain final terpolymer 2 with silane content of 2.0 wt % (0.37 mol %) and BA content of 8 wt % (1.9 mol %).

Polymer (II)

LDPE homopolymer was a commercially available grade obtainable from Borealis and having a MFR$^2$ of 2 g/10 min, a density of 923 kg/m$^3$ and a melting temperature of 111° C.

PP terpolymer was a commercially available $C_2/C_4$ terpolymer of propylene having a trade name of Borseal™ TD218BF, having a MFR$_2$ of 6.0 g/10 min and a melting temperature of 131° C.

Carbon Black

Carbon black was a commercial product with surface area between 30 to 80 m$^2$/g (measured by BET, nitrogen absorption). The other properties are given in Table 1.

TABLE 1

| Polymers | | | |
|---|---|---|---|
| | MFR$_2$ g/10 min | Density ASTM D792 kg/m$^3$ | Melting point ASTM D3418 °C. |
| Terpolymer1 | 4.5 | 920 | 94 |
| Terpolymer2 | 0.6 | 921 | 97 |
| LDPE | 2 | 923 | 111 |
| PP | 6 ( 230° C.) | | 131 |
| Carbon Black | | | |
| Oil adsorp. nr. (ml/100 g) ASTM D2414 | | Iodine nr. (mg/g), ASTM D1510 | |
| 170-200 | | 80 | |
| Stabilizer: Phenolic type stabiliser | | | |

Compositions A to E were prepared as indicated in Table 2, in which also the properties of the compositions are given.

TABLE 2

| | A (ref) | B | C | D | E (Ref 2) |
|---|---|---|---|---|---|
| Formulations | | | | | |
| Terpolymer1/wt. % | 47.25 | | | | 54.25 |
| Terpolymer2/wt. % | | 47.25 | 51.25 | 54.25 | |
| LDPE/wt. % | 24 | 24 | 24 | | |
| PP/wt. % | | | | 15 | 15 |
| Carbon black/wt. % | 28 | 28 | | 30 | 30 |
| Carbon black/wt. % | | | 24 | | |
| Stabiliser/wt. % | 0.75 | 0.75 | 0.75 | 0.75 | 0.75 |
| Properties | | | | | |
| Volume resistivity/ Ohm cm ISO 3915 | <1000 | <1000 | <1000 | <1000 | <1000 |
| MFR$_{21}$ (190° C., 21.6 kg), ISO 1133 | 32 | 8.6 | 23 | 5 | 17 |
| Stickiness | | | | | |
| 75° C. | 3 | 5 | 4 | 5 | 3 |
| 80° C. | 1 | 5 | 4 | 5 | 2 |
| 85° C. | 1 | 4 | 4 | 4 | 1 |
| 90° C. | 1 | 4 | 4 | 4 | 1 |

We claim:

1. A semiconductive polyolefin composition comprising:
(i) up to 80 wt. % of a polyolefin (1),
(ii) carbon black, and
(iii) up to 60 wt. % of a polymer (II) having a melting point of not less an 100° C.;
wherein the polyolefin (I) comprises a first ethylene copolymer and second ethylene copolymer;
wherein the first ethylene copolymer comprises a polar group containing co-monomers in an amount of 3.5 mol % or less; and
wherein the second ethylene copolymer comprises a si lane group containing co-monomers in an amount of 0.7 mol % or less.

2. The semiconductive polyolefin composition according to claim 1, wherein the polyolefin (I) has a degree of crystallinity of not less than 27%.

3. The semiconductive polyolefin composition according to claim 1, wherein polyolefin (I) is present in an amount of 40 to 60 wt. %.

4. The semiconductive polyolefin composition according to claim wherein polymer (II) is present in an amount of 5 to 40 wt. %.

5. The semiconductive polyolefin composition according to claim 1, wherein polymer (II) has a melting poi in the range of from 100 to 170° C. or from 110 to 135° C.

6. The semiconductive polyolefin composition according to claim 1, wherein the polyolefin (I) is a high pressure low density ethylene (LDPE) copolymer.

7. The semiconductive polyolefin composition according to claim 1, wherein the polyolefin (I) is a terpolymer of ethylene with the polar group containing co-monomer and the silane-group containing co-monomer.

8. The semiconductive polyolefin composition according to claim 7, wherein the polar co-monomer is selected from the group consisting of acrylate and acetate co-monomers.

9. The semiconductive polyolefin composition according to claim 7, wherein the silane-group containing co-monomer is selected from the group consisting of vinyl tri-alkoxy silanes.

10. The semiconductive polyolefin composition according to claim 1, wherein the polar co-monomer is selected from the group consisting of acrylate and acetate co-monomers.

11. The semiconductive polyolefin composition according to claim 1, wherein the silane-group containing co-monomer is selected from the group consisting of vinyl tri-alkoxy silanes.

12. The semiconductive polyolefin composition according to claim 1, wherein the polymer (II) is selected from the group consisting of polyethylenes, polypropylenes or polybutylenes.

13. The semiconductive polyolefin composition according to claim 12, wherein the polymer (II) is a homopolymer, a random copolymer or a heterophasic copolymer of propylene.

14. A power cable comprising at least one semiconductive layer comprising a semiconductive polyolefin composition according to claim 1.

15. The power cable according to claim 14, which is a medium voltage power cable.

16. A power cable comprising a conductor, a first semiconductive layer (a), an insulation layer (b) and a second semiconductive layer (c) each coated on the conductor in this order, wherein at least one of the first and second semiconductive layer(s) ((a) and (c)) comprises the semiconductive polyolefin composition according to claim 1.

17. The power cable according to claim 16, wherein at least one of the first (a) and the second (c) semiconductive layers is cross-linked.

18. The power cable according to claim 16, wherein the second semiconductive layer (c) is non-strippable from the insulation layer.

19. The power cable according to claim 16, which is a medium voltage power cable.

20. A process for producing a power cable comprising a conductor, a first semiconductive layer (a), an insulation layer (b) and a second semiconductive layer (c) each coated on the conductor in this order, comprising the steps of:
(i) providing the semiconductive polyolefin composition according to claim 1, by blending the polyolefin (I), carbon black and the polymer (II) together, optionally with additives, at a temperature above melting point of the polymer components,
(ii) co-extruding the melt at elevated temperature above the melting point of the polymer components, together with the polymer melt for any of the other layers, on a conductor for forming a layered power cable structure, and (iii) winding the obtained layered power cable onto a cable drum.

21. The process according to claim 20, wherein the power cable comprises at least one cross-linkable layer, a cross-linkable insulation layer (b) and a cross-linkable second semiconductive layer (c).

22. The process according to claim 20, wherein the power cable is further subjected to a cross-linking step at elevated temperature.

23. The process according to claim 20, wherein the cross-linking step includes a steam or water treatment.

24. The process according to claim 22, wherein the cross-linking step is effected at a cross-linking temperature of not less than 75° C.

25. The process according to claim 20, wherein the power cable comprises at least a cross-linkable first semiconductive layer (a), a cross-linkable insulation layer (b) and a cross-linkable second semiconductive layer (c).

* * * * *